Figure 1:
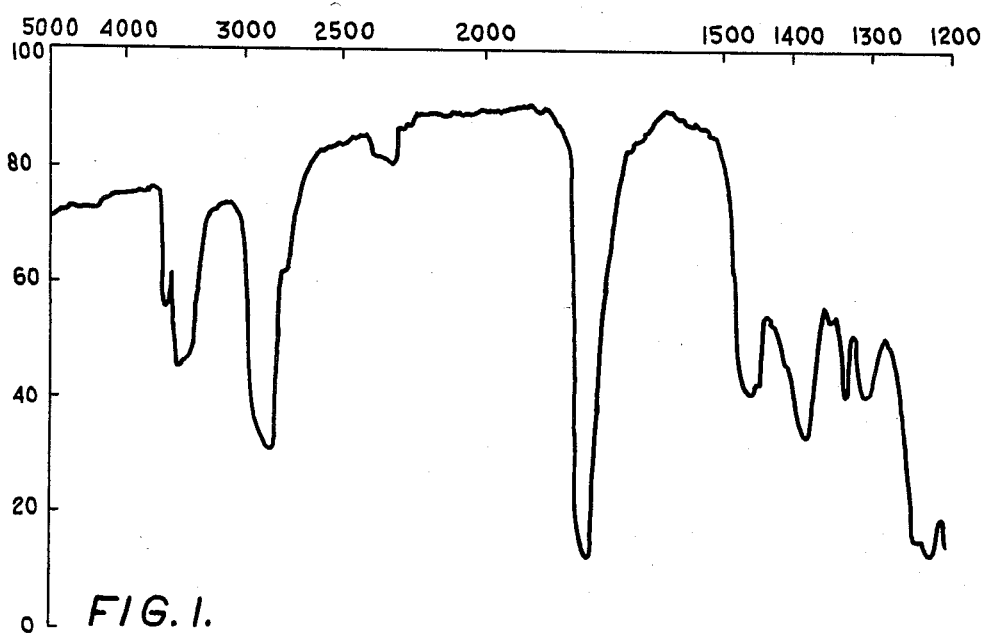

INVENTORS
HAROLD A. NASH
ROBERT M. BROOKER
BY *John W. Lee*
ATTORNEY

INVENTORS
HAROLD A. NASH
ROBERT M. BROOKER

2,929,812
PHYSIOLOGICALLY ACTIVE ALKALOIDS PROTOVERATRINE A AND PROTOVERATRINE B

Harold A. Nash and Robert M. Brooker, Indianapolis, Ind., assignors to Allied Laboratories, Inc., Kansas City, Mo., a corporation of Delaware Application December 29, 1958, Serial No. 783,555

3 Claims. (Cl. 260—236)

This invention relates to physiologically active alkaloids and to processes for their production. More particularly, it relates to the recovery and/or separation of two new alkaloids from protoveratrine.

*Veratrum album* has long been known to contain alkaloids that are effective in lowering blood pressure, one of the most important ones being protoveratrine. In spite of this property, alkaloidal preparations from *Veratrum album* have been used to treat high blood pressure only sporadically during the last 70 years. One reason for their sporadic use has been that the range between the dose causing blood pressure fall and the dose causing undesirable side effects, such as vomiting, is a narrow one. Striking this narrow range with the complex mixture of alkaloids as isolated from the plant is very difficult and this is especially true when it is considered that *Veratrum album* roots from various sources and during various seasons of the year vary in their alkaloidal content and proportion of alkaloids. Biological assays conducted on each lot of alkaloids have permitted more accurate dosing, but the results obtained are still quite variable.

Attempts have been made in the past to insolate pure individual alkaloids from *Veratrum album* with the hope that one having a high hypotensive action and uniformity of composition could be found. One of the alkaloidal substances isolated in the past and previously thought to be a pure substance is known as protoveratrine. Protoveratrine isolated and purified by published procedures [Craig and Jacobs, J. Biol. Chem., 143, 427 (1942); Jacobs and Craig J. Biol. Chem., 149, 271 (1943)] had a melting point of 265-269 C. with decomposition and an optical rotation of $(\alpha)_D^{25}$ of $-39.0°$ in pyridine c=1 in pyridine) which have been considered criteria of purity.

In accordance with the present invention, we have discovered that protoveratrine is in fact a mixture containing varying proportions of two alkaloidal substances. In carrying out our invention, protoveratrine is subjected to a countercurrent distribution treatment which results in the isolation of two new alkaloidal substances which we designate as protoveratrine A and protoveratrine B. There are many ways of carrying out countercurrent distribution processes, and our invention is not limited to any particular technique.

In order to illustrate the invention, the following is a description of a countercurrent distribution process using separatory funnels:

Forty grams of protoveratrine [M.P. 265–269° C. with decomposition, $(\alpha)_c^{25}=-39°$ (c=1 in pyridine)] was introduced into a separatory funnel containing 200 ml. of a 1:1 mixture of ethylene chloride-chloroform and 200 ml. of 2% acetic acid solution. After shaking to effect equilibration, the chloroform-ethylene chloride phase was moved to a second funnel containing 200 ml. of 2% acetic acid. 200 ml. of fresh chloroform-ethylene chloride was moved into funnel No. 1. After shaking to equilibrate, the chloroform-ethylene chloride phase from funnel No. 2 was moved into funnel No. 3 (containing 200 ml. of 2% acetic acid solution), the chloroform-ethylene chloride phase from funnel No. 1 was moved into funnel No. 2; and fresh chloroform-ethylene chloride was moved into funnel No. 1. This process was repeated until the chloroform-ethylene chloride reach funnel No. 15.

At this point examination showed a separation into two alkaloids, one being concentrated in funnels 1 through 5 and the other in funnels 7 through 14. The alkaloids were recovered by drawing off and pooling the appropriate chloroform-ethylene chloride phases and then making the appropriate 2% acetic acid phases alkaline with ammonia and repeatedly extracting with small portions of chloroform, the chloroform being appropriately combined with the previously withdrawn chloroform-ethylene chloride. The combined cloroform and chloroform-ethylene chloride solutions were concentrated to about 80 ml. in each case and 100 ml. of ether added to cause crystallization of the alkaloids.

The alkaloid recovered from funnels 1 through 5 has been named protoveratrine B. It has been found on hydrolysis to yield one mole each of protoverine, 2-methylbutyric acid, 2,3-dihydroxy-2-methylbutyric acid and two moles of acetic acid. It melts at 268–270° C. with decomposition, has $(\alpha)_D^{25}$ of $-37.0°$ (c=1 in pyridine), and has $(\alpha)_D^{25}$ of $-3.5°$ (c=1 in chloroform). Protoveratrine B is further identified by the following partial empirical formula indicating the ester groups.

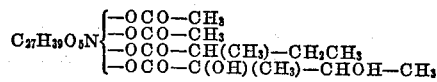

The name protoveratrine A has been adopted for the alkaloid recovered from funnels 7 through 14. It yields one mole each of protoverine, 2-methylbutyric acid, 2-hydroxy-2-methyl butyric acid and two moles of acetic acid on hydrolysis. It melts with decomposition at 267–269° C., has $(\alpha)_D^{25}$ of $-40.5°$ (c=1 in pyridine), and has $(\alpha)_D^{25}$ of $-10.5°$ (c=1 in chloroform). Protoveratrine A is further identified by the following partial empirical formula indicating the ester groups.

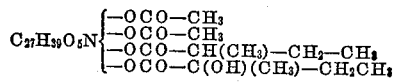

The exact funnels in which the two alkaloids are to be found in a distribution of *n* steps depends in some degree on the starting concentration of alkaloid. This is so because the distribution coefficients of the alkaloids between the two phases vary with concentrations of the alkaloids. In a series of distributions in which 20 ml. of aqueous and 20 ml. of organic solvent phase were used in each funnel and a total of 2 gm. of alkaloids was used, chloroform-2% aqueous acetic acid solution was a preferred solvent combination. In this case, using 15 steps protoveratrine B was found concentrated in funnels 1 through 7 and protoveratrine A was found concentrated in funnels 8 through 14.

It is seen that our invention makes it possible to separate two new *Veratrum album* alkaloids from protoveratrine, which contains a mixture of indefinite proportions, depending on the proportion of each in a particular batch of root, and which mixture in the past has been considered a single alkaloidal substance. Since these new alkaloids differ in their physiological characteristics, it is desirable that pure alkaloids be made available for the treatment of hypotensive patients. As previously indicated, the range between the hypotensive dose and the dose producing undesirable side effects, such as vomiting, is narrow in the case of the *Veratrum album* alkaloidal mixture. It is a distinct advantage of our invention, therefore, that protoveratrine of the prior art, varying in the proportion of desirable alkaloidal components, can be separated into pure individual alkaloids. When desired, the pure alkaloid protoveratrine A or the pure alkaloid protoveratrine B may be used. Since, however, they both possess desirable hypotensive action, it is economically important that they both be utilized. In this respect, the pure alkaloidal substances may be recombined in mixture having a definite and uniform proportion of each alkaloid. In other cases, one of the pure alkaloidal substances may be added to protoveratrine to adjust the proportions of the individual components.

In addition to the solvent substances employed in our specific example, ethylene chloride-2% acetic acid has also been used and found satisfactory. Likewise, various acids or buffer substances can be used to acidify the aqueous phase. When chloroform is used in the 2% acetic acid, the upper limit of acidity is probably about pH 4.0. When ethylene chloride is employed, somewhat higher pH values may be employed. With the proper adjustment of the pH values of the aqueous phase, various other solvents such as methylene chloride, methyl-chloroform, and other chlorinated solvents can be substituted for chloroform and ethylene chloride.

In the foregoing illustration of our invention, we have employed protoveratrine isolated from *Veratrum album*. It should be understood, however, that our invention is applicable to protoveratrine regardless of its source, and our invention applies to protoveratrine isolated from any *Veratrum* species.

Figure 2:
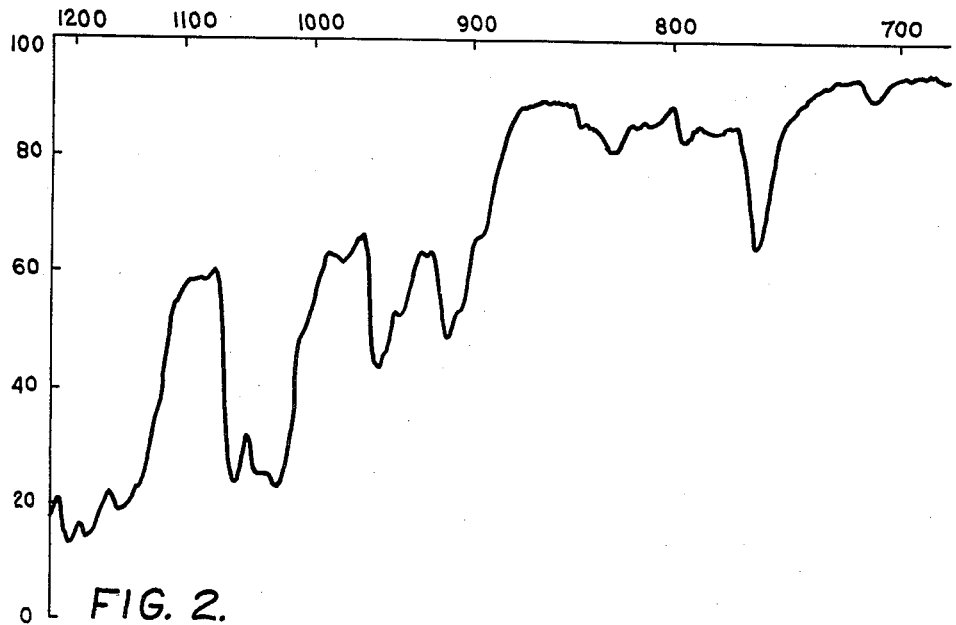

In the drawings, Figures 1 and 2 show the infra-red absorption curve for pure crystalline protoveratrine A in "Nujol" (purified mineral oil) mull. It is shown that protoveratrine A exhibits characteristic absorption bands in the infra-red region of the spectrum at the following frequencies expressed in reciprocal centimeters:

| Absorption 60% and Greater | Absorption 30-59% |
|---|---|
| 2,860 | 3,580 |
| 1,748 | 3,450 |
| 1,378 | 1,462 |
| 1,242 | 1,448 |
| 1,227 | 1,350 |
| 1,200 | 1,330 |
| 1,180 | 1,309 |
| 1,150 | 1,298 |
| 1,137 | 1,080 |
| 1,058 | 980 |
| 1,043 | 956 |
|  | 942 |
|  | 927 |
|  | 912 |
|  | 895 |
|  | 763 |

Figure 3:
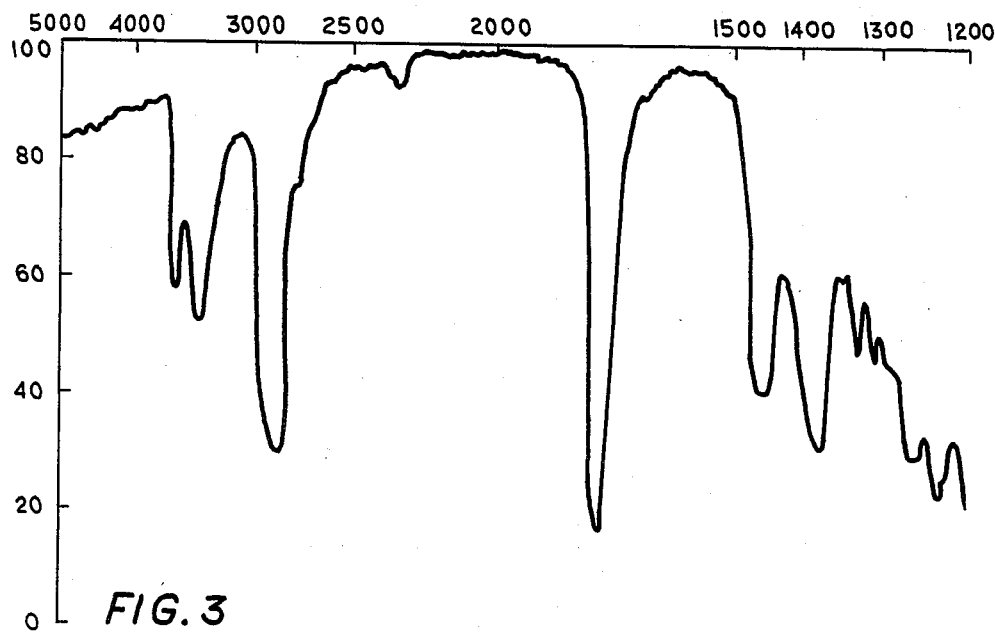
Figure 4:
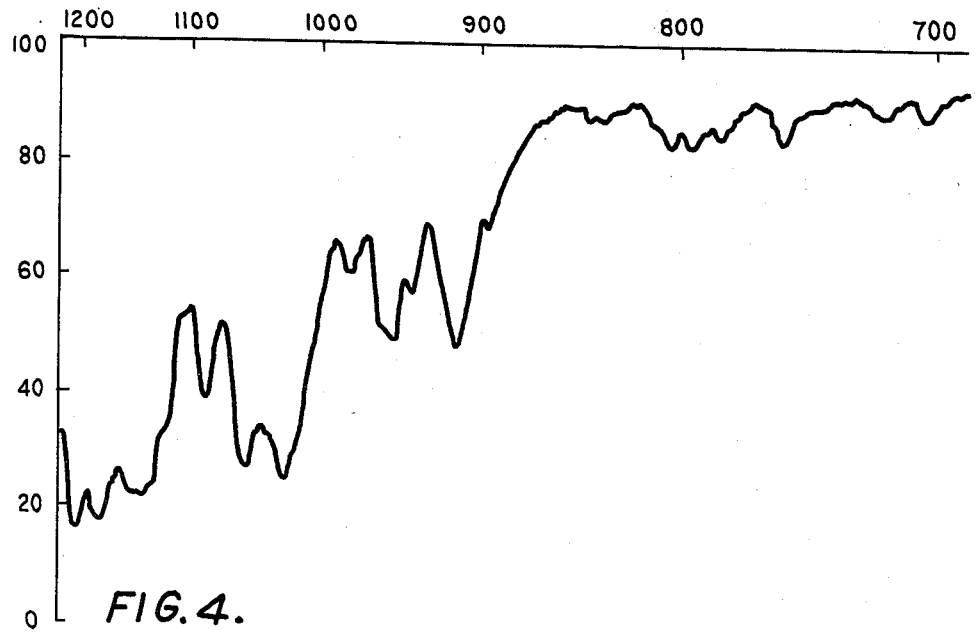

In the drawings, Figures 3 and 4 show the infra-red absorption curve for pure crystalline protoveratrine B in "Nujol" (purified mineral oil) mull. It is shown that protoveratrine B exhibits characteristic absorption bands in the infra-red region of the spectrum at the following frequencies expressed in reciprocal centimeters:

| Absorption 60% and Greater | Absorption 30-59% |
|---|---|
| 2,860 | 3,580 |
| 1,748 | 3,450 |
| 1,378 | 1,462 |
| 1,268 | 1,448 |
| 1,260 | 1,350 |
| 1,235 | 1,330 |
| 1,200 | 1,309 |
| 1,180 | 1,288 |
| 1,156 | 980 |
| 1,140 | 960 |
| 1,087 | 952 |
| 1,058 | 942 |
| 1,043 | 927 |
|  | 912 |
|  | 895 |

This application is a continuation-in-part of the copending application Serial No. 532,804, filed September 6, 1955, now abandoned, which application was a division of application Serial No. 319,433, filed November 7, 1952, now U.S. Patent No. 2,748,112.

We claim:

1. A crystalline product of manufacture having hypotensive activity consisting of an alkaloid selected from the group consisting of crystalline protoveratrine A, represented by the following partial empirical formula indicating the ester groups

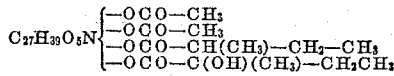

obtained from protoveratrine, said alkaloid having a melting point of about 267° C. with decomposition, $(\alpha)_D^{25}$ of $-40.5°$ in pyridine, $(\alpha)_D^{25}$ of $-10.5°$ in chloroform, and which on hydrolysis yields one mole each of protoverine, 2-methylbutyric acid, and 2-hydroxy-2-methylbutyric acid and two moles of acetic acid, absorption bands in the infra-red region of the spectrum when suspended in the form of a "Nujol" mull at the following frequencies expressed in reciprocal centimeters:

| Absorption 60% and Greater | Absorption 30-59% |
|---|---|
| 2,860 | 3,580 |
| 1,748 | 3,450 |
| 1,378 | 1,462 |
| 1,242 | 1,448 |
| 1,227 | 1,350 |
| 1,200 | 1,330 |
| 1,180 | 1,309 |
| 1,150 | 1,298 |
| 1,137 | 1,080 |
| 1,058 | 980 |
| 1,043 | 956 |
|  | 942 |
|  | 927 |
|  | 912 |
|  | 895 |
|  | 763 | and crystalline protoveratrine B, represented by the following partial empirical formula indicating the ester groups

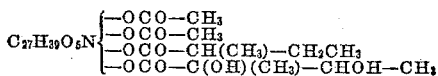

obtained from protoveratrine, said alkaloid having a melting point of about 268–270° C. with decomposition, $(\alpha)_D^{25}$ of $-37.0°$ in pyridine, $(\alpha)_D^{25}$ of $-3.5°$ in chloroform, and which on hydrolysis yields one mole each of protoverine, 2-methylbutyric acid, 2,3-dihydroxy-2-methylbutyric acid and two moles of acetic acid, absorption bands in the infra-red region of the spectrum when suspended in the form of a "Nujol" mull at the following frequencies expressed in reciprocal centimeters:

| Absorption 60% and Greater | Absorption 30-59% |
|---|---|
| 2,860 | 3,580 |
| 1,748 | 3,450 |
| 1,378 | 1,462 |
| 1,268 | 1,448 |
| 1,260 | 1,350 |
| 1,235 | 1,330 |
| 1,200 | 1,309 |
| 1,180 | 1,288 |
| 1,156 | 980 |
| 1,140 | 960 |
| 1,087 | 952 |
| 1,058 | 942 |
| 1,043 | 927 |
|  | 912 |
|  | 895 |

2. A crystalline product of manufacture having hypotensive activity consisting of an alkaloid, protoveratrine A, represented by the following partial empirical formula indicating the ester groups

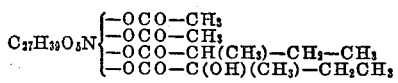

obtained from protoveratrine, said alkaloid having a melting point of about 267–269° C. with decomposition, $(\alpha)_D^{25}$ of 40.5° in pyridine, $(\alpha)_D^{25}$ of −10.5° in chloroform, and which on hydrolysis yields one mole each of protoverine, 2-methylbutyric acid, and 2-hydroxy-2-methylbutyric acid and two moles of acetic acid, absorption bands in the infra-red region of the spectrum when suspended in the form of a "Nujol" mull at the following frequencies expressed in reciprocal centimeters:

| Absorption 60% and Greater | Absorption 30–59% |
|---|---|
| 2,860 | 3,580 |
| 1,748 | 3,450 |
| 1,378 | 1,462 |
| 1,242 | 1,448 |
| 1,227 | 1,350 |
| 1,200 | 1,330 |
| 1,180 | 1,309 |
| 1,150 | 1,298 |
| 1,137 | 1,080 |
| 1,058 | 980 |
| 1,043 | 956 |
|  | 942 |
|  | 927 |
|  | 912 |
|  | 895 |
|  | 763 |

3. A crystalline product of manufacture having hypotensive activity consisting of an alkaloid, protoveratrine B, represented by the following partial empirical formula indicating the ester groups

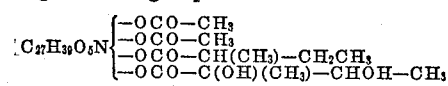

obtained from protoveratrine, said alkaloid having a melting point of about 268–270° C. with decomposition, $(\alpha)_D^{25}$ of −37.0° in pyridine, $(\alpha)_D^{25}$ of 3.5° in chloroform, and which on hydrolysis yields one mole each of protoverine, 2-methylbutyric acid, 2,3-dihydroxy-2-methylbutyric acid and two moles of acetic acid, absorption bands in the infra-red region of the spectrum when suspended in the form of a "Nujol" mull at the following frequencies expressed in reciprocal centimeters:

| Absorption 60% and Greater | Absorption 30–59% |
|---|---|
| 2,860 | 3,580 |
| 1,748 | 3,450 |
| 1,378 | 1,462 |
| 1,268 | 1,448 |
| 1,260 | 1,350 |
| 1,255 | 1,330 |
| 1,200 | 1,309 |
| 1,180 | 1,288 |
| 1,156 | 980 |
| 1,140 | 960 |
| 1,087 | 952 |
| 1,058 | 942 |
| 1,043 | 927 |
|  | 912 |
|  | 895 |

References Cited in the file of this patent

Nash: J. Am. Chem. Soc., vol. 75, pp. 1942–8 (1953).